(12) United States Patent
Regnault (10) Patent No.: US 10,459,434 B2
(45) Date of Patent: Oct. 29, 2019

(54) INSPECTION TOOL FOR MANUFACTURED COMPONENTS

(71) Applicant: BOMBARDIER INC., Dorval (CA)

(72) Inventor: Laurent Regnault, Montreal (CA)

(73) Assignees: BOMBARDIER INC., Montreal (CA); C SERIES AIRCRAFT LIMITED PARTNERSHIP, Mirabel (CA)

( * ) Notice: Subject to any disclaimer, the term of this patent is extended or adjusted under 35 U.S.C. 154(b) by 242 days.

(21) Appl. No.: 15/513,844

(22) PCT Filed: Sep. 21, 2015

(86) PCT No.: PCT/IB2015/057271
§ 371 (c)(1),
(2) Date: Mar. 23, 2017

(87) PCT Pub. No.: WO2016/046729
PCT Pub. Date: Mar. 31, 2016

(65) Prior Publication Data
US 2017/0248940 A1    Aug. 31, 2017

Related U.S. Application Data (60) Provisional application No. 62/055,026, filed on Sep. 25, 2014.

(51) Int. Cl.
*G05B 19/418* (2006.01)
*G07C 3/14* (2006.01)
*G01B 21/04* (2006.01)

(52) U.S. Cl.
CPC . *G05B 19/41875* (2013.01); *G05B 19/41805* (2013.01); *G07C 3/14* (2013.01); *G01B 21/04* (2013.01); *G05B 2219/31064* (2013.01); *G05B 2219/32212* (2013.01); *G05B 2219/32213* (2013.01); *G05B 2219/35226* (2013.01);
(Continued)

(58) Field of Classification Search
CPC ........ G05B 19/41875; G05B 19/41805; G05B 2219/32212; G05B 2219/32213; G05B 2219/35226; G07C 3/14; G01B 21/04
See application file for complete search history.

(56) References Cited

U.S. PATENT DOCUMENTS 6,522,993 B1    2/2003  Tomko
6,748,284 B1    6/2004  Vaughan et al.
(Continued)

FOREIGN PATENT DOCUMENTS

GB    2194367    3/1988

OTHER PUBLICATIONS

Rolls, "Cad Model Construction from CMM and Laser Scanning Data for Reverse Engineering", A Thesis submitted to the Faculty of Graduatte Studies and Research, University of Windsor, 203 pp, 2001.
(Continued)

*Primary Examiner* — Bryan Bui
(74) *Attorney, Agent, or Firm* — Norton Rose Fulbright Canada LLP (57) ABSTRACT

There is described herein an inspection tool for use during the inspection of components as manufactured. The inspection tool allows the comparison of measurement data with nominal data and provides complementary information with regards to at least one feature of the component.

14 Claims, 8 Drawing Sheets

(52) U.S. Cl.
CPC ..... *G05B 2219/37079* (2013.01); *Y02P 90/04* (2015.11); *Y02P 90/22* (2015.11)

(56) References Cited

U.S. PATENT DOCUMENTS

| | | |
|---|---|---|
| 6,904,330 B2 * | 6/2005 | Popp ................. A61F 13/15772 700/110 |
| 7,146,291 B2 | 12/2006 | Hough |
| 8,447,549 B2 | 5/2013 | Doytchinov et al. |
| 2004/0030432 A1 * | 2/2004 | Popp ................. A61F 13/15772 700/109 |
| 2014/0067333 A1 | 3/2014 | Rodney et al. |
| 2015/0153732 A1 | 6/2015 | Scelsi et al. |

OTHER PUBLICATIONS

Ruegsegger, "Intelligent Automated Process Planning and Code Generation for Computer-Controlled Inspection", University of Cleveland, 150 pp, Jan. 1994.
International Search Report and Written Opinion issued in connection with PCT Application No. PCT/IB2015/057271 dated Dec. 4, 2015.

* cited by examiner

INSPECTION TOOL FOR MANUFACTURED COMPONENTS

CROSS-REFERENCE TO RELATED APPLICATIONS

This application claims priority under 35 U.S.C. 119(e) to U.S. application No. 62/055,026 filed Sep. 25, 2014, entitled "Inspection Tool for Manufactured Components", the entire contents of which are hereby incorporated by reference.

TECHNICAL FIELD

The present invention relates to the field of inspecting manufactured components and more particularly, to validating measurements of manufactured components compared to nominal values.

BACKGROUND OF THE ART

In certain fields, such as the aerospace industry, components that deviate from nominal values even minimally are found to be unacceptable. The requirements for fabrication are very stringent and inspection is critical to ensure high quality products. However, when different components are fabricated by different suppliers, it can be difficult to obtain a same quality of inspection across all suppliers. It can also be difficult to receive inspection reports that are uniform and provide the same level of detail.

Therefore, there is a need to overcome some of the challenges associated with the inspection of components.

SUMMARY

There is described herein an inspection tool for use during the inspection of components as manufactured. The inspection tool allows the comparison of measurement data with nominal data and provides complementary information with regards to at least one feature of the component.

In some embodiments, the complimentary information is related to an impact resulting from assembling the manufactured component with other components. More particularly, the tool provides information regarding how measured values which exceed predetermined tolerances may affect an assembly that includes the component. In some embodiments, the complimentary information also comprises a risk level of the impact in accordance with a risk scale correlated with the tolerance for the at least one feature.

In accordance with a first broad aspect, there is provided a computer-implemented method for inspecting a manufactured component to be assembled with other components. The method comprises receiving measurement data for the manufactured component; comparing the measurement data to tolerance data for at least one feature of the manufactured component and determining a pass/fail status based on the comparison; for a fail status, identifying an impact resulting from assembling the manufactured component with the other components; and displaying the pass/fail status for each one of the at least one feature and displaying the impact associated with the fail status.

In some embodiments, the method further comprises identifying a risk level of the impact in accordance with a risk scale correlated with the tolerance data for the at least one feature.

In some embodiments, comparing the measurement data comprises calculating a parameter based on the measurement data and comparing the parameter to the tolerance data.

In some embodiments, the parameter is an aerodynamic angle and the component is an aircraft component.

In some embodiments, the method further comprises displaying a graphical representation of the measurement data.

In some embodiments, displaying a graphical representation comprises displaying the measurement data and the tolerance data on an image of the component.

In some embodiments, the image is an engineering drawing.

In some embodiments, displaying the measurement data comprises modifying a scale of the measurement data to correspond to a scale of the component on the image and tracing lines on the image to represent the measurement data.

In some embodiments, the method further comprises receiving an identification of the component with the measurement data and retrieving a parameterized model of the component for comparing with the measurement data.

In some embodiments, the method further comprises displaying any combination of the tolerance data, deviation from the tolerance data, a graphical representation of the measurement data, a graphical representation of the tolerance data, calculated parameters, and a risk level with a result of the comparison.

In accordance with another broad aspect, there is provided a graphical user interface for inspection of a manufactured component to be assembled with other components. The graphical user interface comprises an identification of a component under inspection, and a result of a comparison of the measurement data to tolerance data for at least one feature of the manufactured component. The result comprises a pass/fail status for each of the at least one feature, and for a fail status, an impact resulting from assembly of the manufactured component with the other components.

In some embodiments, the result further comprises a risk level of the impact in accordance with a risk scale correlated with the tolerance data for the at least one feature.

In some embodiments, the graphical user interface further comprises an input area for receiving measurement data for the manufactured component.

In some embodiments, the result further comprises a parameter calculated from the measurement data and used in the comparison with the tolerance data for the at least one feature.

In some embodiments, the graphical user interface further comprises a graphical representation of the measurement data.

In some embodiments, the graphical user interface further comprises a graphical representation of the tolerance data.

In some embodiments, the graphical representation comprises an image of the component with the measurement data overlaid thereon.

In some embodiments, the image of the component is an engineering drawing.

In some embodiments, the result further comprises any combination of the tolerance data, deviation from the tolerance data, a graphical representation of the measurement data, a graphical representation of the tolerance data, calculated parameters, and a risk level with the result of the comparison.

In accordance with yet another broad aspect, there is provided a system for inspecting a manufactured component to be assembled with other components, the system comprising a memory, a processor; and at least one application stored in the memory and executable by the processor. The at least one application is executable for receiving measurement data for the manufactured component; comparing the measurement data to tolerance data for at least one feature of the manufactured component and determining a pass/fail status based on the comparison; for a fail status, identifying an impact resulting from assembling the manufactured component with the other components; and displaying the pass/fail status for each one of the at least one feature and displaying the impact associated with the fail status.

In some embodiments, the application is further configured for identifying a risk level of the impact in accordance with a risk scale correlated with the tolerance data for the at least one feature.

In some embodiments, comparing the measurement data comprises calculating a parameter based on the measurement data and comparing the parameter to the tolerance data.

In some embodiments, the parameter is an aerodynamic angle and the component is an aircraft component.

In some embodiments, the application is further configured for displaying a graphical representation of the measurement data.

In some embodiments, displaying a graphical representation comprises displaying the measurement data and the tolerance data on an image of the component.

In some embodiments, the image is an engineering drawing.

In some embodiments, displaying the measurement data comprises modifying a scale of the measurement data to correspond to a scale of the component on the image and tracing lines on the image to represent the measurement data.

In some embodiments, the application is further configured for receiving an identification of the component with the measurement data and retrieving a parameterized model of the component for comparing with the measurement data.

In some embodiments, the application is further configured for displaying any combination of the tolerance data, deviation from the tolerance data, a graphical representation of the measurement data, a graphical representation of the tolerance data, calculated parameters, and a risk level with a result of the comparison.

In accordance with another broad aspect, there is provided a computer readable medium having stored thereon program code executable by a processor for inspecting a manufactured component to be assembled with other components. The program code is executable for receiving measurement data for the manufactured component; comparing the measurement data to tolerance data for at least one feature of the manufactured component and determining a pass/fail status based on the comparison; for a fail status, identifying an impact resulting from assembling the manufactured component with the other components; and displaying the pass/fail status for each one of the at least one feature and displaying the impact for the fail status.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
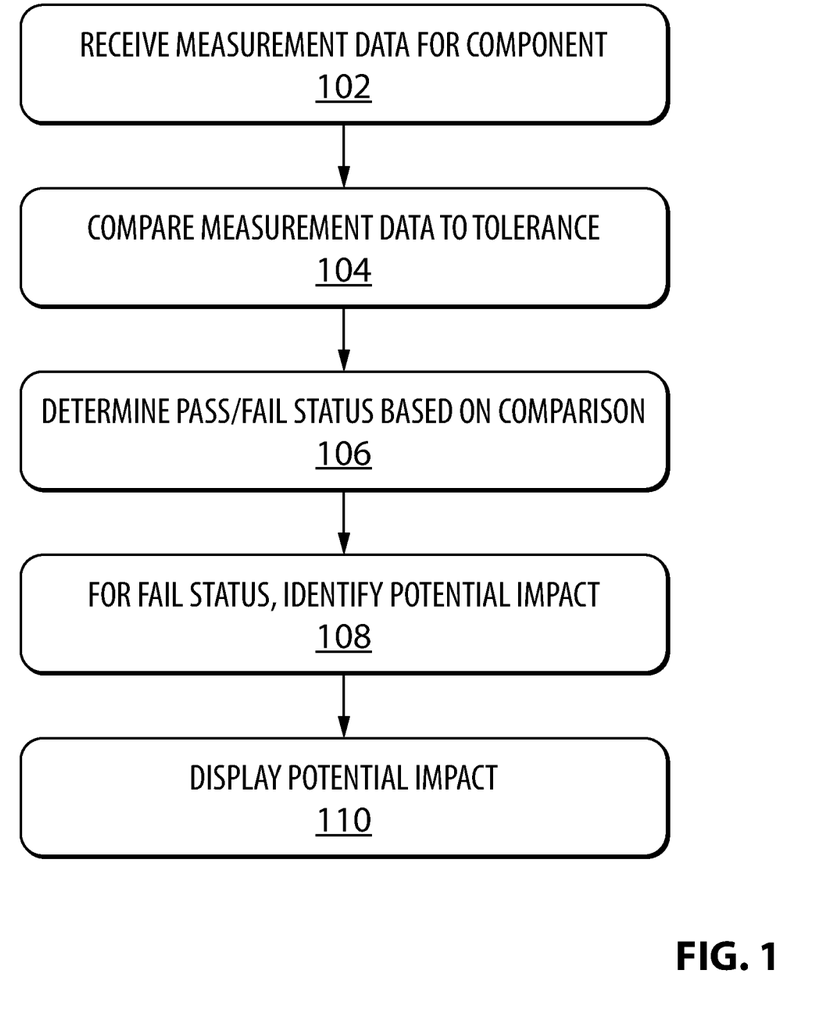
FIG. 1 is a flowchart of an exemplary computer-implemented method as performed by an inspection tool.
Figure 2:
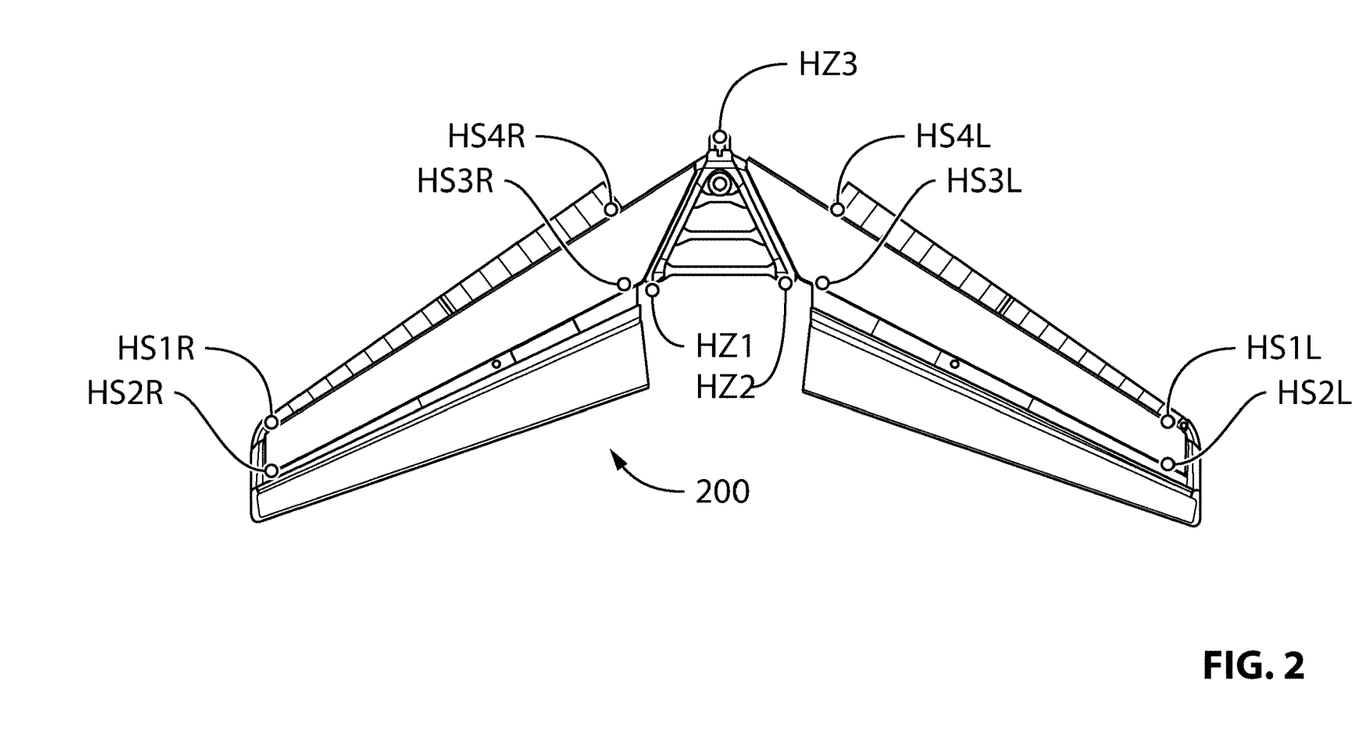
FIG. 2 is an exemplary component for inspection by the inspection tool.

FIG. 1 is a flowchart of an exemplary computer-implemented method as performed by an inspection tool. In a first step 102, measurement data for the manufactured component is received. FIG. 2 is an exemplary component 200 intended for assembly with other components to form an aircraft. The component 200 is a horizontal stabilizer (H-stab) of the rear of an aircraft. The H-stab will form part of the tail of the aircraft when assembled with a vertical stabilizer and a rudder. Some of the locations on the component 200 from which measurements may be taken and provided as measurement data are illustrated in FIG. 2. In this example, eleven points are measured on the component and are identified as HS1R, HS2R, HS3R, HS4R, HZ1, HZ2, HZ3, HS1L, HS2L, HS3L, and HS4L. More or less than these measurement points may be obtained. Measurements may be taken manually or using one or more automated tools. Note that a component and/or assembly reference system is used to locate the measured points in space. In the case of the H-stab, an aircraft reference system is used and each point on the aircraft may be referred to with an (x, y, z) coordinate.

The measurements may be provided to the inspection tool using a graphical user interface, as will be described in more detail below. Similarly, the points to be measured may also be displayed on a graphical user interface for an operator to perform the measurements and/or to control measurement tools for obtaining the measurements.

Referring back to FIG. 1, measurement data is compared to tolerance data for at least one feature in step 104. In some embodiments, the measurements are themselves compared to nominal values for the measured points. Alternatively, the measurements are used to calculate parameters corresponding to at least one feature of the component. For the H-stab, some examples of parameters are a sweep angle, a dihedral angle, and a differential incidence. Other parameters may also be determined for the H-stab. Different parameters will be determined as a function of the component under inspection and the desired features to be inspected.

Various calculations may be performed to determine the parameters. In some embodiments, only part of the (x, y, z) coordinate for a given point is used in a calculation. For example, the left and right dihedral angles may be calculated using the following, respectively:

$$\text{Arctan}((HS2L\ Z-HS4L\ Z)/(HS4L\ Y-HS2L\ Y))$$

$$\text{Arctan}((HS2R\ Z-HS4R\ Z)/(HS4R\ Y-HS2R\ Y))$$

An H-stab differential dihedral angle may then be calculated by subtracting the right dihedral angle from the left dihedral angle. The dihedral angle may also be calculated using other points on the component and/or other formulas. The calculations may be performed automatically on the basis of the measurement data as received. Alternatively, the tool may require additional input from the user to calculate the parameters, such as a prompt or an identification of the parameters to be calculated.

As per step 106, a pass/fail status is determined based on a comparison of the calculated parameters (or the measurement data) with tolerance data. Tolerance data refers to the amounts by which specified nominal values may vary without significantly affecting the functioning and/or the quality of the component. The tolerances are specified for each feature of the component to allow reasonable leeway for imperfections and inherent variability without compromising performance. A variation beyond the tolerance is said to be non-compliant.

Each parameter may be assigned a set of tolerances including a minimum and a maximum deviation from the specified nominal value. For example, the sweep angle may deviate by a minimum value of −0.05° and a maximum value of +0.05°, or ±0.05°. Similarly, the dihedral angle may deviate by a minimum value of −0.15° and a maximum value of +0.15°, or ±0.15°. These values are obtained by a parameterization of a given component. They may be specified using various mathematical models and/or computer simulations in order to determine the acceptable tolerances for each feature of the component.

At step 108, for a fail status, a potential impact resulting from assembling the manufactured component with the other components is identified. In some embodiments, an entire assembly is parameterized feature by feature, i.e. parameterization is performed for a plurality of components assembled together. For example, an entire aircraft may be parameterized by defining the nominal values for the parameters of each component, and by defining allowable tolerances for each parameter. The interaction of one component with another component within the assembly is thus considered for an assembly parameterization. For example, the H-stab is meant to interface with the fuselage of the aircraft. An excessive deviation in the dimensions of the interfacing surface may cause a clash or an excessive gap with the fuselage. Non-compliant dimensions of the H-stab may also cause an excessive transverse load on an actuator of the aircraft. If one or more of the various angles defined by the H-stab are non-compliant, it may lead to a decreased performance of the aircraft due to excessive fuel consumption or reduced maneuverability of the aircraft. In some embodiments, a parameterization may take into account a specific model of the assembly, a manner in which the components are assembled together, industry standards for performance, safety requirements, and/or materials. These factors may be considered individually or using any combination thereof.

As per step 110, the potential impacts associated with a given parameter are displayed by the inspection tool for parameters having a fail status. In some embodiments, a risk scale may be used to further qualify the potential impact and the risk level is displayed with the potential impact. The scale may have two, three, or more levels, each level indicating a risk level of the potential impact occurring. For example, the scale may comprise three levels set to low risk, medium risk, and high risk. In another example, the scale may comprise four levels set to low risk, risk, high risk, very high risk. The risk scale may be set with the number of levels as desired. In some embodiments, each level may be associated with a range of values beyond the tolerance data. For example, if the tolerance for the sweep angle is set to ±0.05°, the risk scale may be set as follows:

TABLE 1

| Deviation | Risk Level |
| --- | --- |
| ±0.05° | No Risk |
| ±0.06° | Low Risk |
| ±0.07° | Medium Risk |
| ±0.08° | High Risk |

In some embodiments, the risk scale is used for variations within the tolerance data instead of beyond the tolerance data and the highest level is set for a deviation of the maximum/minimum amount from the nominal value. For example, the risk scale for the sweep angle may be set as follows:

TABLE 2

| Deviation | Risk Level |
| --- | --- |
| ±0.02° | No Risk |
| ±0.03° | Low Risk |
| ±0.04° | Medium Risk |
| ±0.05° | High Risk |

The increments of the risk scale may be constant or they may vary from one level to the next. For example, the difference between the first level and the second level may be 0.01° while the difference between the second level and the third level may be 0.005°. The values associated with each level of the risk scale may be set in accordance with a desired specificity for manufactured components. Increments may be of one decimal place (0.x), two decimal places (0.0x), three decimal places (0.00x), etc. The units of the increments will correspond to the units of the parameter or measurement data, such as degree, radian, steradian, meters, kilograms, square meter, cubic meter, etc.

Figure 3:
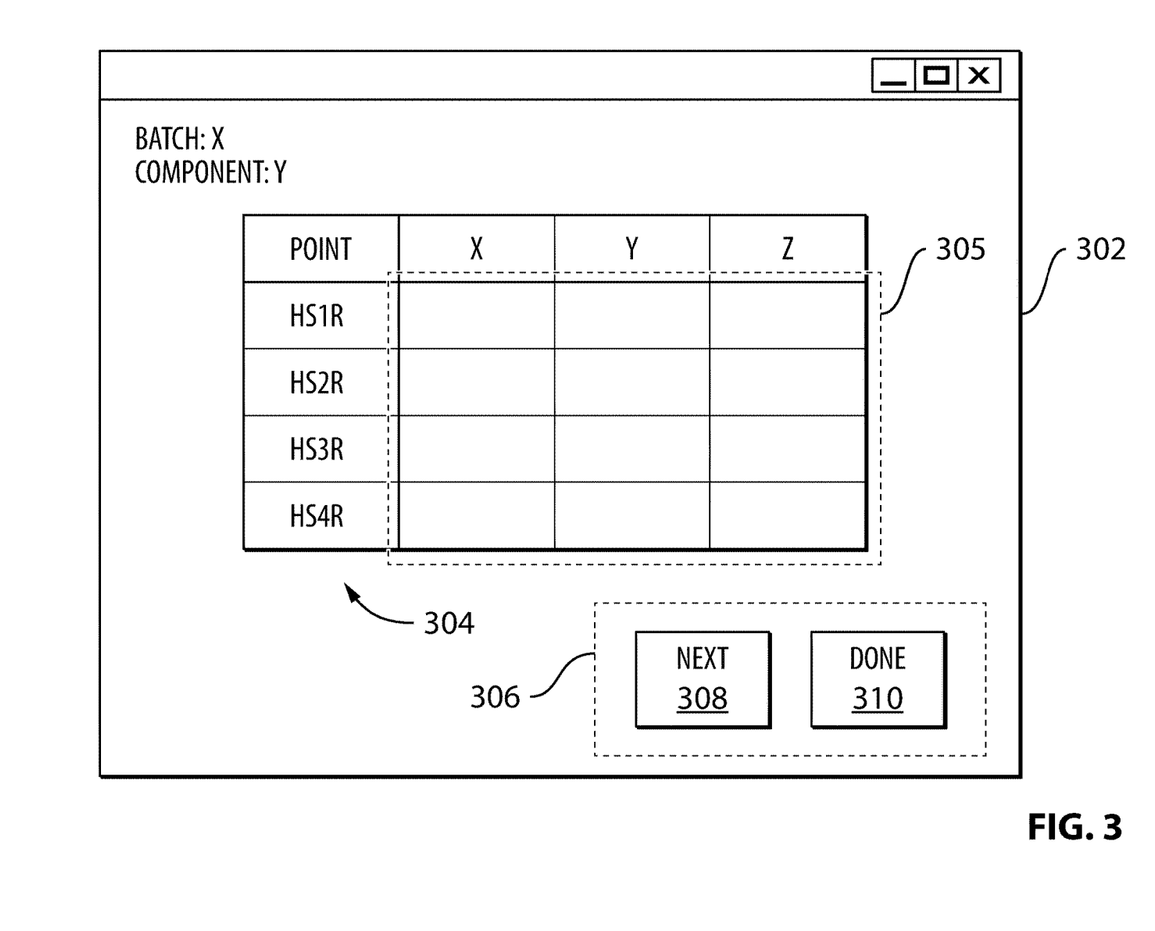
FIG. 3 is an exemplary graphical user interface for input of measurement data.

FIG. 3 is an exemplary graphical user interface 302 for inspection of the manufactured component to be assembled with other components. In some embodiments, an input area 304 is provided for receiving measurement data for the manufactured component. In this example, separate values are entered for x, y, and z coordinates. However, data may be entered in various ways. One or more fields may be displayed for data entry, such as in a table format, as illustrated, or one at a time. The points to be measured on the component may form sub-groups for which data is entered together. For example, and as is illustrated in FIG. 3, data entry fields 305 are displayed for points HS1R-HS4R. Data entry fields for other points to be measured may be displayed separately once the data has been entered for points HS1R-HS4R.

In some embodiments, an actionable object 306 is provided. The actionable object 306 may be any graphical control element that invokes an action when activated by a user. It is selectable by a user for confirming that the measured data has been entered. In this example, a "next" button 308 is used to confirm that data for points HS1R-HS14 has been entered and to move on to another set of points. A "done" button 310 is used to confirm that all measurement data for the given component has been entered. The actionable object 306 may take various forms, such as a button, a slider, an icon, a list box, a spinner, a drop-down list, a link, a tab, a scroll bar, and/or any combination thereof. More or less elements may be used for the actionable object 306. In some embodiments, the actionable object 306 may comprise a control element to select a component, an assembly, a model of the assembly, and/or a measured point on a component. For example, the actionable object 306 may be a pull-down menu with a list of measured points and upon selection of one, a data entry field is presented to the user in the input area 304.

In some embodiments, the measurement data may be provided automatically to the inspection tool without manual entry. For example, the inspection tool may be operatively connected to a measurement tool and data may be transferred from the measurement tool to the inspection tool. Other methods of providing measurement data to the inspection tool will be readily understood by those skilled in the art.

Figure 4:
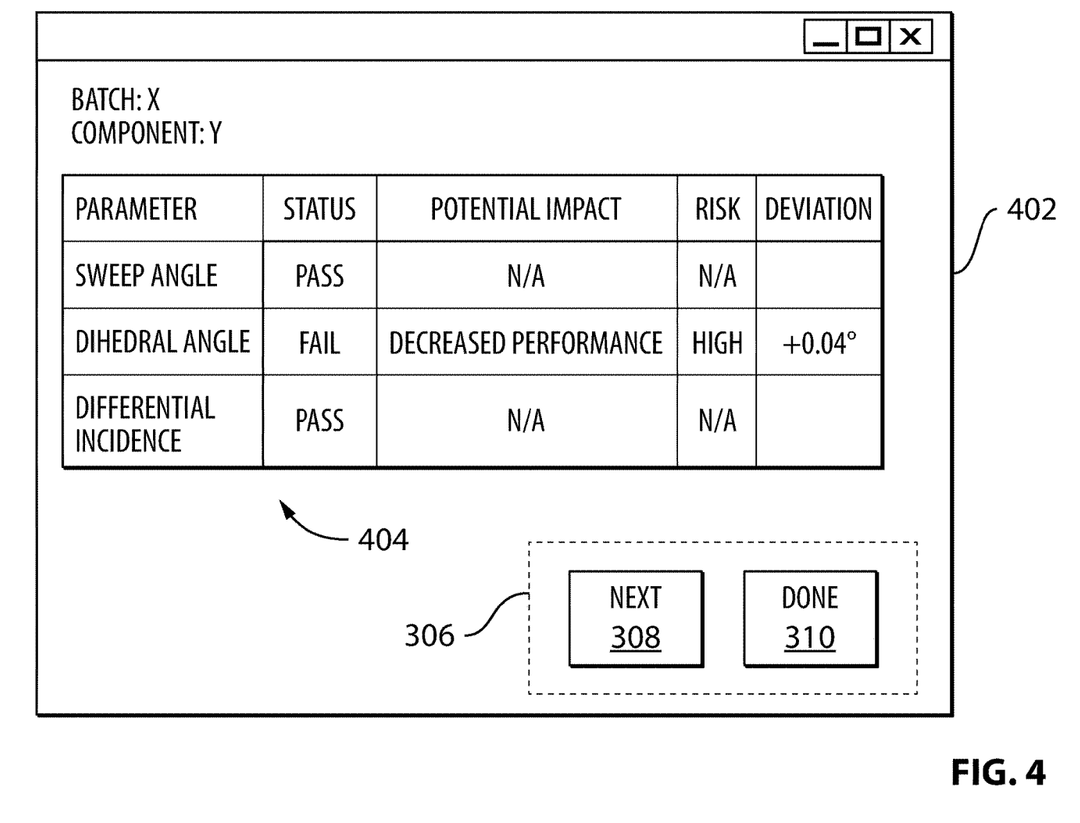
FIG. 4 is an exemplary graphical user interface for display of comparison results.

FIG. 4 is another example of a graphical user interface 402. In this embodiment, an output area 404 is provided for displaying a result of the comparison of the measurement data with the tolerance data for at least one feature of the manufactured component. In some embodiments, the output area comprises only a pass/fail status and for each fail status, an impact resulting from assembly of the manufactured component with the other components. In some embodiments, the risk level of the impact in accordance with the risk scale is also displayed. In some embodiments, a deviation amount for a fail status is also displayed. The deviation amount may be displayed without the risk scale. Other information may also be displayed, such as the measurement data and/or calculated parameters, and the minimum/maximum tolerance values.

Figure 5:
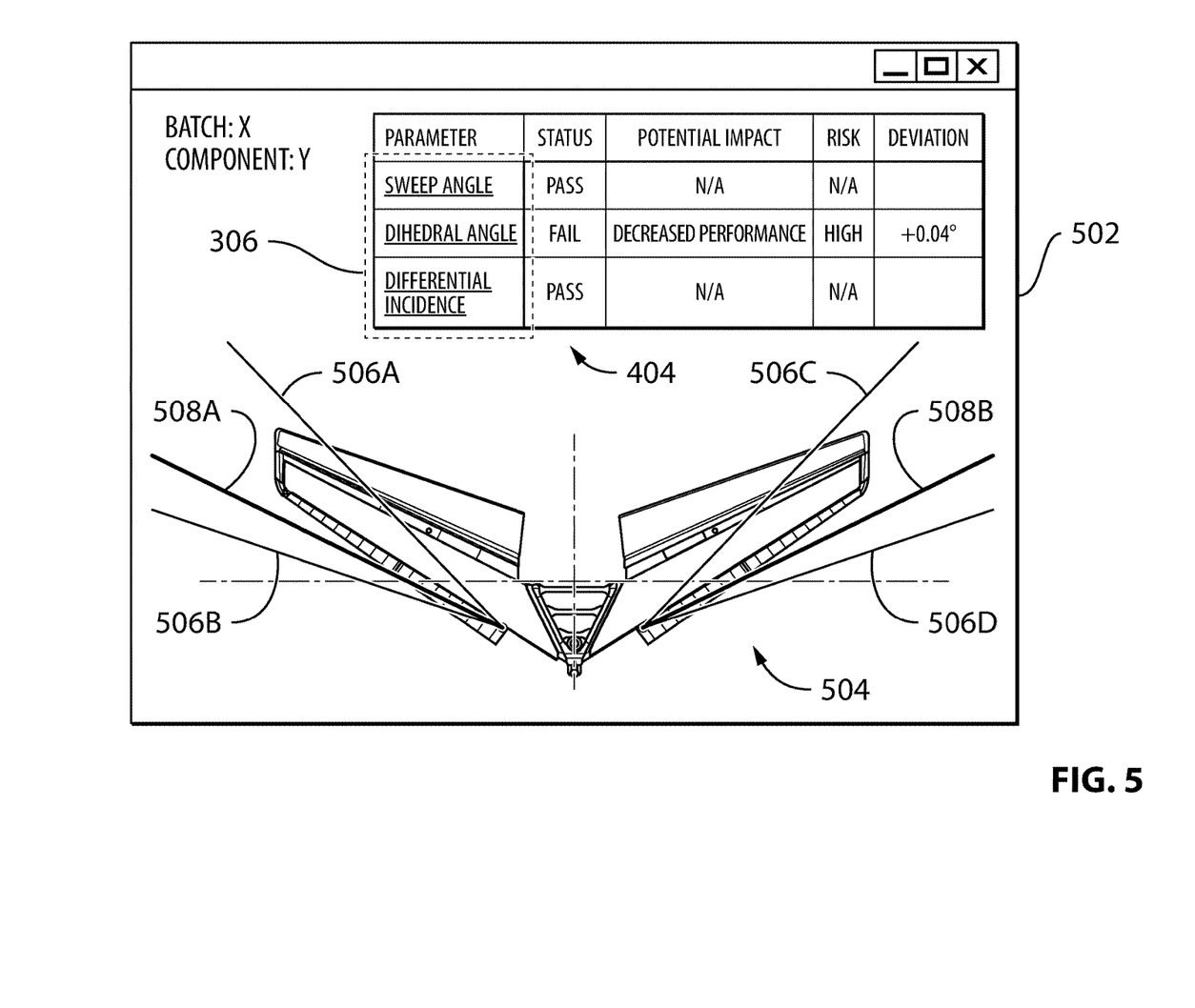
FIG. 5 is an exemplary graphical user interface for display of graphical representations of the comparison results on a top view of an image of the component.
Figure 6:
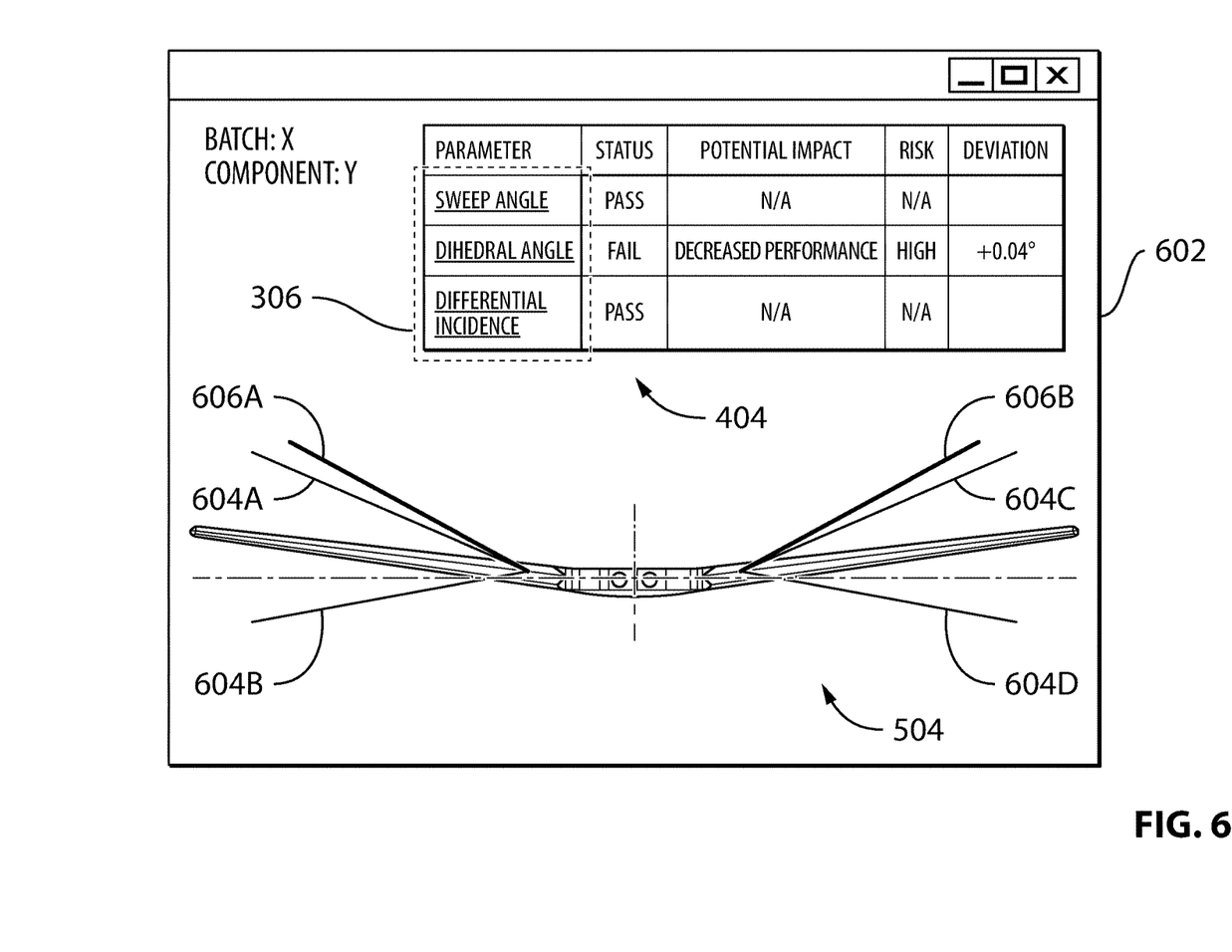
FIG. 6 is an exemplary graphical user interface for display of graphical representations of the comparison results on a back view of an image of the component.

FIG. 5 is yet another example of a graphical user interface 502. In this embodiment, a graphical representation 504 of the measurement data is provided in the output area. In this example, the sweep angle is illustrated using a top view of the H-stab. The parameter, obtained from the measurement data, is illustrated for the left sweep angle 508a and the right sweep angle 508b. In some embodiments, the tolerances may also be illustrated, such as the left maximum sweep angle 506a, the left minimum sweep angle 506b, the right maximum sweep angle 506c, and the right minimum sweep angle 506d. The visual impact of the parameter bounded by the tolerances immediately conveys the pass status of the measurement data for the sweep angle. In the example of FIG. 5, the measurements are provided on an engineering drawing. Other types of images may also be used, from photographs to hand-drawings, to represent the component under inspection. The sweep angle is best illustrated from a top view of the component. FIG. 6 illustrates a graphical representation 504 of the dihedral angle, this one overlaid on a back view of an engineering drawing. The inspection tool may thus be configured to select the appropriate part with the corresponding drawings having been parameterized with the predetermined sets of tolerance data and graphically illustrate the measurements.

In FIG. 6, the calculated angle 606a, 606b, is shown to be outside of the tolerance zone, defined by lines 604a, 604b, 604c, and 604d. Color-coding or other visual indicators may be used to more easily distinguish between the lines that represent measurement data and the lines that represent tolerance data. For example, the measurement data lines 508a, 508b of FIG. 5 have a small shape at their extremities while in FIG. 6, these lines 606a, 606b are provided with a thicker profile. Other distinguishing techniques may be provided. In addition, the inspection tool may be configured to selectively display only the measurement data or only the tolerance data, as per user input.

In the examples of FIGS. 5 and 6, the actionable object 306 is provided as a set of hyperlinks associated with the name of the parameter. These hyperlinks allow the user to select the graphical representation from any one of the features represented by the measurement data. Other means of switching between graphical representations, such as window tabs or drop-down menus, may also be used.

The measurement data may refer to a dimension or an angle. Since the deviation from a nominal value may be extremely small, such as to the hundredth of a degree or a cm, the measurement data may be processed to properly display the information on a much larger scale, i.e. that of the component on the engineering drawing or another image of the component. The inspection tool is may thus be adapted to extract the values as measured, amplify them accordingly, recalculate the points of interest and trace the lines on the engineering drawings (or another image) to provide the graphical representation 504.

The output area 404 of the graphical user interface 402, 502, 602 may be configured in various ways to display the result of the comparison of the measurement data to the tolerance data. The pass/fail status and resulting impact of one or more features may be displayed. Any combination of actual measurements, calculated parameters, tolerance data, risk level, deviation from tolerance data, and graphical representations may be provided. In some embodiments, the output area 404 is customizable to provide the information as desired by a particular user. Note that while the input area is illustrated in FIG. 3 as its own graphical user interface 302 window, a single graphical user interface may provide both the input area and the output area in a single window for viewing on a single screen.

Figure 7:
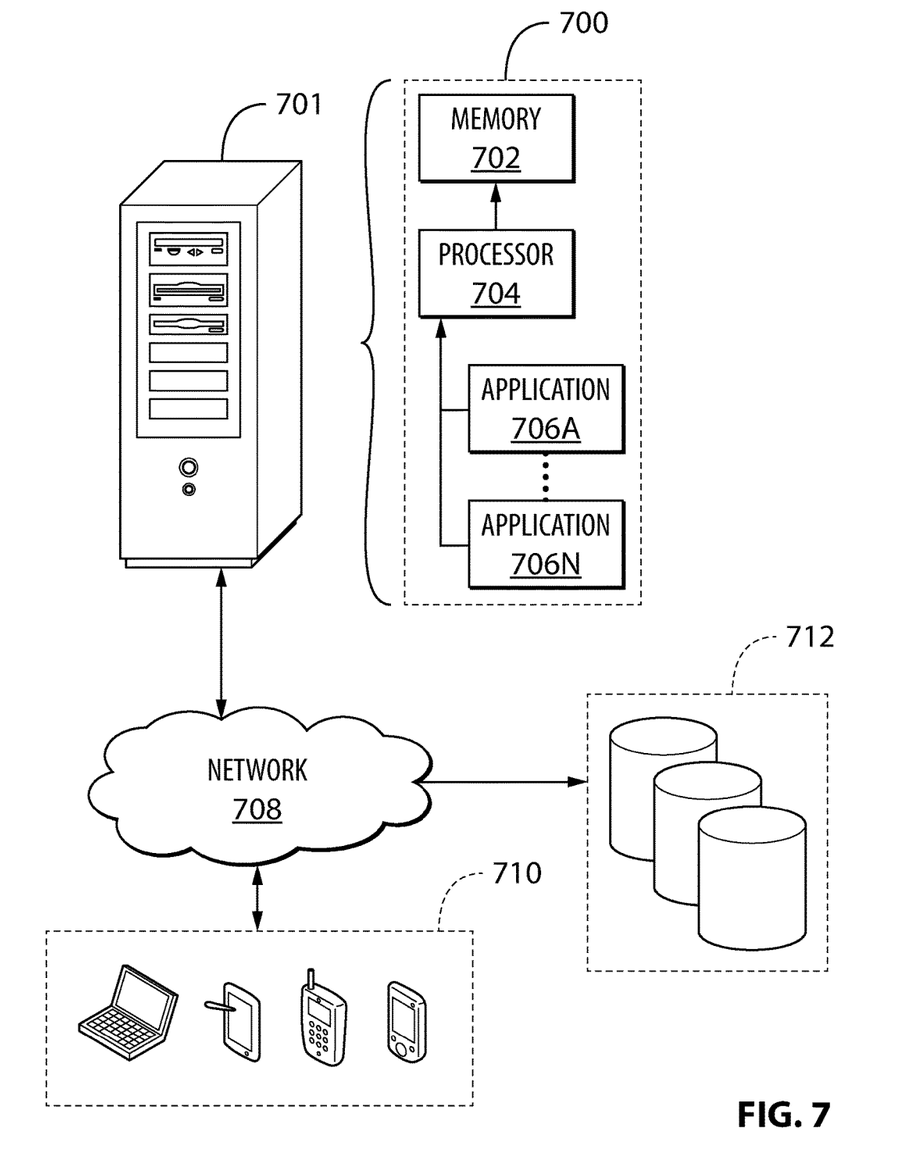
FIG. 7 is an exemplary embodiment of the inspection tool.

FIG. 7 illustrates an exemplary embodiment for the inspection tool 700. The inspection tool 700 may reside on one or more server(s) 701. For example, a series of servers corresponding to a web server, an application server, and a database server may be used. These servers are all represented by server 701 in FIG. 7. The inspection tool 700 may comprise, amongst other things, a processor 704 in data communication with a memory 702 and having a plurality of applications 706a, . . . , 706n running thereon. The processor 704 may access the memory 702 to retrieve data. The processor 704 may be any device that can perform operations on data. Examples are a central processing unit (CPU), a microprocessor, and a front-end processor. The applications 706a, . . . , 706n are coupled to the processor 704 and configured to perform various tasks. It should be understood that while the applications 706a, . . . , 706n presented herein are illustrated and described as separate entities, they may be combined or separated in a variety of ways. It should be understood that an operating system (not shown) may be used as an intermediary between the processor 704 and the applications 706a, . . . , 706n.

The memory 702 accessible by the processor 704 may receive and store data, such as measurement data, tolerances, parameters, pass/fail statuses, potential impacts, risk scales, images of the components, graphical representations of parameters, graphical representations of tolerances, scaling factors, parameterized models of components, etc. The memory 702 may be a main memory, such as a high speed Random Access Memory (RAM), or an auxiliary storage unit, such as a hard disk or flash memory. The memory 702 may be any other type of memory, such as a Read-Only Memory (ROM), Erasable Programmable Read-Only Memory (EPROM), or optical storage media such as a videodisc and a compact disc.

In the embodiment illustrated, the inspection tool 700 is adapted to be accessed by a plurality of devices 710 via a wireless network 708, such as the Internet, a cellular network, Wi-Fi, or others known to those skilled in the art. The devices 710 may comprise any device, such as a laptop computer, a personal digital assistant (PDA), a smartphone, or the like, adapted to communicate over the wireless network 708. Alternatively, the inspection tool 700 may be provided in part or in its entirety directly on devices 710, as a native application or a web application. It should be understood that cloud computing may also be used such that the inspection tool 700 is provided partially or entirely in the cloud. In some embodiments, the application 706a may be downloaded directly onto devices 710 and application 706n communicates with application 706a via the network 708. In some embodiments, the inspection tool 700 may be integrated with a measurement tool and/or an image acquisition device as a downloaded software application, a firmware application, or a combination thereof.

One or more databases 712 may be integrated directly into the memory 702 or may be provided separately therefrom and remotely from the server 700 (as illustrated). In the case of a remote access to the databases 712, access may occur via any type of network 708, as indicated above. The databases 712 may also be accessed through an alternative wireless network or through a wired connection. The databases 712 described herein may be provided as collections of data or information organized for rapid search and retrieval by a computer. The databases 712 may be structured to facilitate storage, retrieval, modification, and deletion of data in conjunction with various data-processing operations. The databases 712 may consist of a file or sets of files that can be broken down into records, each of which consists of one or more fields. Database information may be retrieved through queries using keywords and sorting commands, in order to rapidly search, rearrange, group, and select the field. The databases 712 may be any organization of data on a data storage medium, such as one or more servers.

Figure 8:
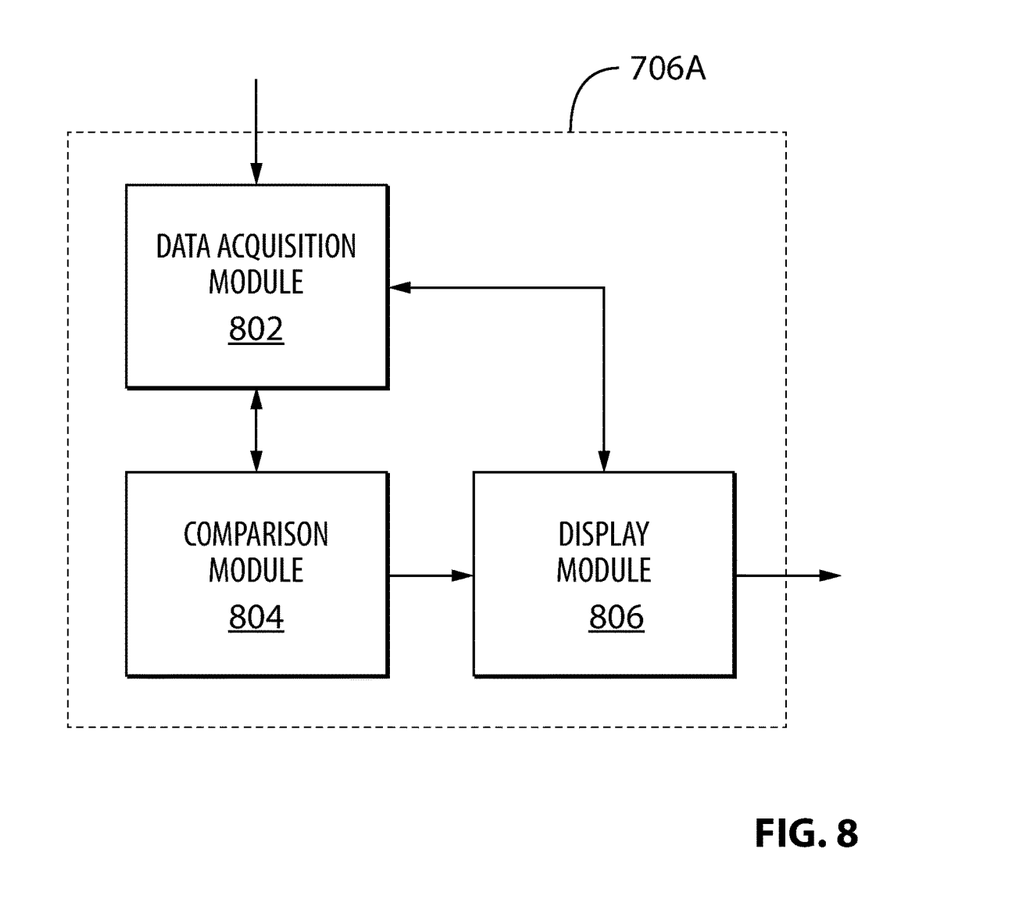
FIG. 8 is a block diagram of an exemplary application running on the processor of the inspection tool.

FIG. 8 is an exemplary embodiment for an application 706a running on the processor 704 of the inspection tool 100. The application 706a illustratively comprises a data acquisition module 802, a comparison module 804, and a display module 806. The data acquisition module may be configured to acquire measurement data, tolerance data, graphical data, impact data, risk data, mathematical formulas, parameterized models, images of components, and any other type of data that may be used by the inspection tool. This data may be acquired by manual input, for example by providing the graphical user interface 302 with an input area for receiving data, as per the example of FIG. 3. It may also be acquired locally from memory 702 or remotely via network 708 from the databases 712 and/or from another entity, such as a measurement tool, an image acquisition device, one or more of the devices 710 or another external server having data stored thereon.

The comparison module 804 may be configured to compare the measurement data to the tolerance data for at least one feature of the component and determine a pass/fail status based on the comparison. In some embodiments, the comparison module 804 may also be configured to transform the measurement data into various parameters, as per the example with the sweep angle and dihedral angle for the H-stab. In some embodiments, this transformation may be performed by the data acquisition module 802 and the parameters are provided to the comparison module 804. The comparison module 804 is thus configured to receive, from the data acquisition module 802, the measurement data (or parameter data) and the tolerance data for the purposes of comparison.

Once the pass/fail status has been established, the display module 806 is configured for displaying the pass/fail status for the at least one feature and an impact resulting from the fail status. The comparison module 804 may communicate with the data acquisition module 802 in order to retrieve the proper impact based on the result of the comparison. For example, if the dihedral angle is too large, the h-stab may clash with the fuselage. If the dihedral angle is too small, there may be a gap between the h-stab and the fuselage. The data acquisition module 802 is thus configured to acquire the appropriate impact and communicate it to the display module 806 for display on the graphical user interface. In some embodiments, instructions to retrieve the appropriate impact may come directly from the display module 806 once it has received the comparison results from the comparison module 804.

In some embodiments, the data acquisition module 802 may also be instructed by the comparison module 804 or the display module 806 to retrieve a risk level associated with the result of the comparison for the at least one feature. As indicated above, the risk level may be correlated with the tolerance for the at least one feature and thus determined once the comparison between the measurement data and the tolerance data have been made. In some embodiments, the risk level is assigned by the comparison module 804 or the display module 806 on the basis of the comparison results.

In some embodiments, the display module 806 is configured to provide a graphical representation of the measurement data, either the raw data itself or a parameter based on the measurement data. The display module 806 may be configured to select an appropriate image of the component, including a proper view to illustrate the feature, and to process the measurement data such that it may be displayed on the image of the component. Processing of the measurement data may comprise extracting the values as measured, amplifying them accordingly, recalculating the points of interest and tracing lines on the image of the component. The display module 806 may also be configured to display the tolerances graphically with the measurement data. The display module 806 may be configured to provide any or all of the information illustrated in the graphical user interfaces 402, 502, 602, including but not limited to raw measurements, calculated parameters, tolerance data, risk level, deviation from tolerance data, and graphical representations.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A computer-implemented method for inspecting a manufactured component to be assembled with other components, the method comprising:
receiving measurement data for the manufactured component as measured on the manufactured component;
comparing the measurement data to tolerance data for at least one feature of the manufactured component and determining a pass/fail status based on the comparison, wherein measurement data within the tolerance data obtains a pass status and measurement data outside of the tolerance data obtains a fail status;
for a fail status, identifying an impact resulting from assembling the manufactured component having a fail status with the other components by considering an interaction of the manufactured component with the other components in an assembly;
displaying the pass/fail status for each one of the at least one feature and displaying the impact associated with the fail status; and
displaying a graphical representation of the measurement data on an image of the component by modifying a scale of the measurement data to correspond to a scale of the component on the image and tracing lines on the image to represent the measurement data.

2. The method of claim 1, further comprising identifying a risk level of the impact in accordance with a risk scale correlated with the tolerance data for the at least one feature.

3. The method of claim 1, wherein comparing the measurement data comprises calculating a parameter based on the measurement data and comparing the parameter to the tolerance data.

4. The method of claim 3, wherein the parameter is an aerodynamic angle and the component is an aircraft component.

5. The method of claim 1, wherein the image is an engineering drawing.

6. The method of claim 1, further comprising receiving an identification of the component with the measurement data and retrieving a parameterized model of the component for comparing with the measurement data.

7. The method of claim 1, further comprising displaying any combination of the tolerance data, deviation from the tolerance data, a graphical representation of the measurement data, a graphical representation of the tolerance data, calculated parameters, and a risk level with a result of the comparison.

8. A system for inspecting a manufactured component to be assembled with other components, the system comprising:
a memory;
a processor; and
at least one application stored in the memory and executable by the processor for:
receiving measurement data for the manufactured component as measured on the manufactured component;
comparing the measurement data to tolerance data for at least one feature of the manufactured component and determining a pass/fail status based on the comparison, wherein measurement data within the tolerance data obtains a pass status and measurement data outside of the tolerance data obtains a fail status;
for a fail status, identifying an impact resulting from assembling the manufactured component having a fail status with the other components by considering an interaction of the manufactured component with the other components in an assembly;
displaying the pass/fail status for each one of the at least one feature and displaying the impact associated with the fail status; and
displaying a graphical representation of the measurement data on an image of the component by modifying a scale of the measurement data to correspond to a scale of the component on the image and tracing lines on the image to represent the measurement data.

9. The system of claim 8, wherein the application is further configured for identifying a risk level of the impact in accordance with a risk scale correlated with the tolerance data for the at least one feature.

10. The system of claim 8, wherein comparing the measurement data comprises calculating a parameter based on the measurement data and comparing the parameter to the tolerance data.

11. The system of claim 10, wherein the parameter is an aerodynamic angle and the component is an aircraft component.

12. The system of claim 8, wherein the image is an engineering drawing.

13. The system of claim 8, wherein the application is further configured for receiving an identification of the component with the measurement data and retrieving a parameterized model of the component for comparing with the measurement data.

14. The system of claim 8, wherein the application is further configured for displaying any combination of the tolerance data, deviation from the tolerance data, a graphical representation of the measurement data, a graphical representation of the tolerance data, calculated parameters, and a risk level with a result of the comparison.

* * * * *